March 8, 1966  H. HERMAN  3,238,612
FRICTION WELDING
Filed March 5, 1964
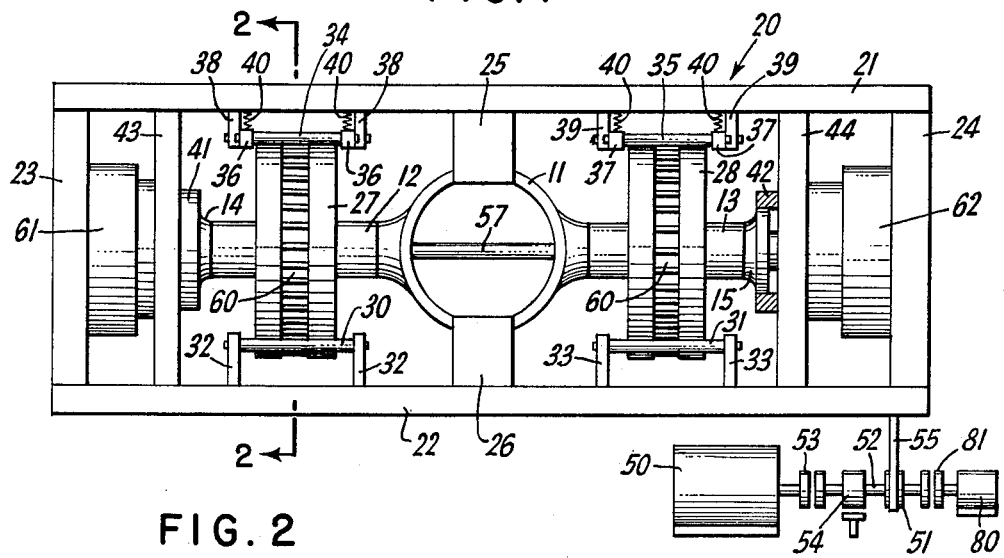
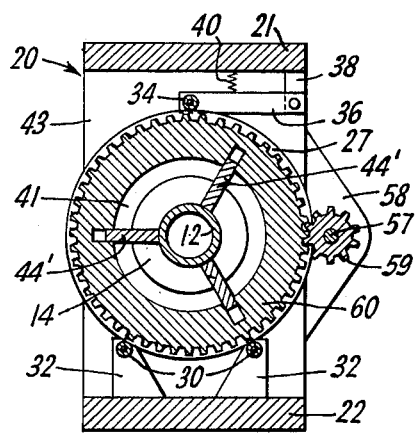
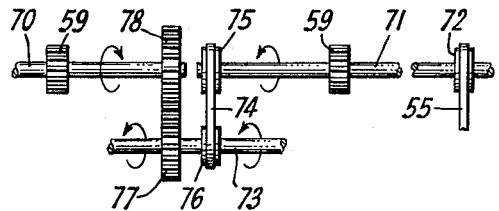
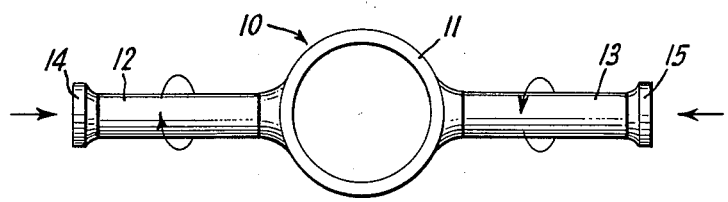
INVENTOR
HAMILTON HERMAN
BY
ATTORNEY

United States Patent Office 3,238,612
Patented Mar. 8, 1966

3,238,612
FRICTION WELDING
Hamilton Herman, New Canaan, Conn., assignor to American Machine & Foundry Company, a corporation of New Jersey
Filed Mar. 5, 1964, Ser. No. 349,547
9 Claims. (Cl. 228—2)

This invention relates in general to friction welding and, more particularly, to methods and apparatus for friction welding automobile, truck and the like vehicle axle and differential assemblies.

An automobile or truck rear axle and differential housing consists of a central differential or gear housing to which two axle tubes are welded to project from each side. End flanges are then welded to the ends of the axle tubes to complete the assembly. Such housings are conventionally assembled by arc welding or like methods which are slow, costly and have caused high rejection rates in the fabricated assembly.

It is, therefore, a main object of this invention to provide a stronger, less costly and more rapidly produced rear axle and differential housing.

Another object of this invention is to provide a friction welded rear axle and differential housing which is less susceptible to fatigue than are conventional arc welded units.

A further object of this invention is to provide a method and an apparatus with which a rear axle and differential housing may be friction welded and non-destructively tested.

Many other objects, advantages and features of the invention reside in the particular construction, combination and arrangement of parts involved in the embodiments of my invention and its practice as will be understood from the following description and accompanying drawing wherein:

FIGURE 1 is a front view of an apparatus used to friction weld a rear axle and differential housing assembly with one end flange holding chuck shown in section;

FIGURE 2 is a section taken on line 2—2 of FIGURE 1;

FIGURE 3 is a fragment of an alternate drive which may be applied to the apparatus shown in FIGURE 1; and FIGURE 4 is an elevational view of a rear axle and differential housing.

Referring to the drawing in detail, FIGURE 4 shows a rear axle and differential housing assembly generally designated by the numeral 10. The assembly 10 consists of a central differential housing 11 to which the axle tubes 12 and 13 are welded. The end flanges 14 and 15 are welded to the axle tubes 12 and 13.

Friction welding is accomplished by relatively rotating two workpieces, forcing the workpieces together to generate heat of friction in the area of contact between the workpieces, and rapidly stopping the relative rotation of the workpieces while continuing to force them together to complete the weld. Thus, as shown in FIGURE 4, the housing 11 may be prevented from rotating as the tubes 12 and 13 are rotated and pressed against it to weld them to the housing 11. The end flanges 14 and 15 may then be rotated and forced against the tubes 12 and 13 to complete the friction welding of the assembly 10.

In a like manner, the gear housing 11 may be rotated as the axle tubes 12 and 13 are prevented from rotating and pressed against it. After the tubes 12 and 13 have been friction welded to the housing 11, the housing 11 may be again rotated together with the welded tubes 12 and 13 while the end flanges are pressed inwards against the tubes 12 and 13 to weld them in place.

FIGURE 1 shows an apparatus, generally designated by the character 20, which may be used to friction weld a rear axle and differential housing in yet another manner. The friction welding apparatus 20 has an upper horizontal member 21 and a lower horizontal member 22 which are connected by the end members 23 and 24 to form a rigid rectangular frame. Centrally located jaws 25 and 26 are fixed to the upper and lower members 21 and 22 to secure a gear housing 11 between them. Two large chucks 27 and 28 are rotatably supported by lower pairs of rollers 30 and 31 which are journalled between the pairs of brackets 32 and 33. Upper rollers 34 and 35 are rotatably mounted between the ends of the pivotally secured arms 36 and 37 which are attached to the brackets 38 and 39. Compression springs 40 urge the arms 36 and 37 and the rollers 34 and 35 downward to hold the chucks 27 and 28 in position. Stationary chucks 41 and 42 are fixed to the slidably mounted members 43 and 44, which may slide laterally along the upper and lower members 21 and 22.

The stationary chucks 41 and 42 are made to hold the end flanges 14 and 15. The chucks 27 and 28, as shown in FIGURE 2, contain jaws 44' which may be extended inward to grasp and secure the axle tubes 12 and 13. The jaws 44' may be withdrawn or retracted a sufficient distance from the axle tubes 12 or 13 so that an end flange 14 or 15 may pass between them when chucks 27 and 28 are removed from a completed and welded rear axle and differential housing assembly 10.

Referring further to FIGURE 1, a motor 50 drives a pulley 51 mounted on a shaft 52 through a clutch 53. A brake 54 is also mounted on shaft 52. By means of a belt 55 and a pulley (not shown), pulley 51 drives shaft 57 which is rotatably journalled behind the end members 23 and 24 in the pair of projections 58 extending rearwardly from them. Spur gears 59 are mounted on the shaft 57 to engage gear teeth 60 formed in a circumferential groove about the outer surfaces of the chucks 27 and 28. Two large short stroke hydraulic or pneumatic cylinders 61 and 62 are fixed to the end members 23 and 24 so that, when the cylinders 61 and 62 are activated, they slide the slidably mounted members 43 and 44 inward to move the stationary chucks 41 and 42 inward.

The first embodiment of this invention may be used in the following manner. A gear housing 11 is secured in the central jaws 25 and 26. Axle tubes 12 and 13 are secured within two chucks 27 and 28. The chucks 27 and 28 are then placed upon the rollers 30 and 31 as shown. End flanges 14 and 15 are secured within the chucks 41 and 42. Motor 50 is then started and clutch 53 engaged so that belt 55 rapidly rotates shaft 57. Pinions 59 then rotate the chucks 27 and 28 at a desired speed.

If an inertia friction weld is to be accomplished, the clutch 53 is disengaged after the chucks 27 and 28 reach the required speed. The cylinders 61 and 62 are then activated to force the end flanges inward against the rotating axle tubes 12 and 13. The axle tubes 12 and 13 are also forced against the gear housing 11. If sufficient kinetic energy has been stored in the rotating chucks 27 and 28 and the axle tubes 12 and 13, an inertia friction weld will be accomplished as kinetic energy is converted to heat in the weld areas and the axle tubes come to a stop.

If a conventional friction weld is to be made, the chucks 27 and 28 are rotated in the manner which has been described at a required speed. As motor 50 drives the chucks 27 and 28, the cylinders 61 and 62 are activated to force the relatively rotating workpieces together. After sufficient heat is generated in the weld area, clutch 53 is disengaged and brake 54 is applied to stop relative rotation of the workpieces. The workpieces are continued to be forced together to complete the four friction welds of assembly 10.

After either a conventional or an inertia friction weld has been completed, the stationary chucks 41 and 42 are disengaged from the now welded end flanges 14 and 15. The cylinders 61 and 62 are retracted, drawing the chucks 41 and 42 away from the end flanges 14 and 15. The central jaws 25 and 26 are disengaged so that the welded rear axle and differential housing 10 with attached chucks 27 and 28 may be removed from the apparatus. The chucks 27 and 28 are then disengaged from the axle tubes 12 and 13 and removed.

Referring now to FIGURE 3, a second embodiment of this invention replaces the shaft 57 with the two butted shafts 70 and 71. Shaft 71 is driven by belt 55 and pulley 72 which is mounted on it. The pinions 59 are mounted on the shafts 70 and 71. A third shaft 73 is rotatably journalled a short distance away from shafts 70 and 71. By means of a belt 74 and the two pulleys 75 and 76, shaft 73 is driven by shaft 71 in the same direction as shaft 71. By means of two spur gears 77 and 78, shaft 73 drives shaft 70 *in the opposite direction. Thus shaft 71 revolves in one direction and shaft 70 in the other.* Therefore, by means of spur gears 59, chuck 27 is driven in one direction and chuck 28 in the other. Either conventional or inertia friction welds may be accomplished in the manner which has been described.

The second embodiment of this invention enjoys the added advantage that torque in one direction exerted by axle tube 13 on gear housing 11 during friction welding is countered by torque exerted by axle tube 12 in the other direction. Thus the central jaws 25 and 26 may be relatively light so that they are easier to fabricate and to use. In addition, the entire friction welding apparatus may be made lighter and may be more easily and less securely mounted as torque exerted by each of the chucks 27 and 28 and the axle tubes 12 and 13 is balanced.

Before removing a welded assembly 10 from the apparatus 20, brake 54 may be released and clutch 53 disengaged. If clutch 81 is then engaged, motor 80 may be used to apply a given torque to the axle tubes 12 and 13. This torque may be used to test the strength and integrity of the welds in the completed assembly 10. If sufficient torque is applied, the assembly 10 will sustain all torque loads to which it may be subjected in operation in a vehicle. Such torque tests may also be correlated with bending and other loads to which an assembly 10 may be subjected.

While this invention has been shown and described in the best forms known, it will nevertheless be understood that these are purely exemplary and that modifications may be made in the construction, combination and arrangement of parts without departing from the spirit and scope of the invention except as it may be more limited in the appended claims wherein:

What is claimed is:

1. The process of friction welding a rear axle and differential housing assembly comprising the steps of placing axle tubes on each side of a gear housing and placing end flanges at the ends of the axle tubes, securing the end flanges and the gear housing against rotation, and rapidly rotating the axle tubes and forcing the end flanges inward to complete the friction welding of the rear axle and differential housing assembly.

2. The process of friction welding a rear axle and differential housing assembly comprising the steps of placing axle tubes on each side of a gear housing and placing end flanges at the ends of the axle tubes, securing the end flanges and the gear housing against rotation, and rapidly rotating the axle tubes in opposite directions and forcing the end flanges inward to complete the friction welding of the rear axle and differential housing assembly.

3. The process of friction welding a rear axle and differential housing assembly comprising the steps of placing axle tubes on each side of a gear housing and placing end flanges at the ends of the axle tubes, placing massive chucks about the axle tubes, securing the end flanges and the gear housing against rotation, rapidly rotating the massive chucks and the axle tubes, and forcing the end flanges inward to complete the inertia friction welding of the rear axle and differential housing assembly.

4. An apparatus for friction welding rear axle and differential housings having a central gear housing, two axle tubes extending from the sides of said gear housing, and end flanges disposed on the ends of said axle tubes; said apparatus comprising, in combination, central holding means securing a gear housing against rotation, slidably mounted chucks disposed on each side of said central holding means, said slidably mounted chucks securing end flanges, rotatably mounted chucks disposed between said central holding means and said slidably mounted chucks, said rotatably mounted chucks each holding an axle tube between an end flange and a gear housing, means rotating said rotatably mounted chucks, and means urging said slidably mounted chucks inward to friction weld a rear axle and differential housing.

5. The combination according to claim 4 wherein said means rotating said rotatably mounted chucks rotates said rotatably mounted chucks in opposite directions.

6. An apparatus for friction welding rear axle and differential housings having a central gear housing, two axle tubes extending from the sides of said central gear housing, and end flanges disposed on the ends of said axle tubes; said apparatus comprising, in combination, a generally rectangular frame having upper and lower members and end members extending between said upper and lower members, central holding means fixed to said upper and lower members securing a gear housing against rotation between said upper and lower members, slidably mounted members extending between said upper and lower members inside said end members, means extending between said end members and said slidably mounted members to urge said slidably mounted members inward, stationary chucks fixed to said slidably mounted members, said stationary chucks each securing an end flange against rotation, rotatably mounted chucks disposed between said stationary chucks and said central holding means, said rotatably mounted chucks each holding an axle tube, and means rotating said rotatably mounted chucks, said means extending between said end members and said slidably mounted members urging said slidably mounted members inward and forcing said end flanges against said axle tubes to form a friction welded rear axle and differential housing.

7. The combination according to claim 6 wherein said drive means rotating said rotatably mounted chucks comprises a rotatably mounted shaft disposed behind said rotatably mounted chucks, motor means rotating said shaft, and drive means enabling said shaft to rotate said rotatably mounted chucks.

8. The combination according to claim 6 wherein said drive means rotating said rotatably mounted chucks rotates said rotatably mounted chucks in opposite directions.

9. An apparatus for friction welding rear axle and differential housings having a central gear housing, two axle tubes extending from the sides of said gear housing, and end flanges disposed on the ends of said axle tubes; said apparatus comprising, in combination, central holding means securing a gear housing against rotation, slidably mounted chucks disposed on each side of said central holding means, said slidably mounted chucks securing end flanges, rotatably mounted chucks disposed between said central holding means and said slidably mounted chucks, said rotatably mounted chucks each holding an axle tube between an end flange and a gear housing, means rapidly rotating said rotatably mounted chucks, means urging said slidably mounted chucks inward to friction weld a rear axle and differential housing, and means to exert a torque on said rotatably mounted chucks after a rear axle and differential housing has been welded, said means to exert a torque exerting a torque and testing the welds of a welded rear axle and differential housing.

References Cited by the Examiner

UNITED STATES PATENTS 3,134,278   5/1964   Hollander et al. _____ 228—2

OTHER REFERENCES

Vill' V.L.: Friction Welding of Metals, New York American Welding Society, Inc., 1962 (Russian Translation of Text published by Mashgiz in 1959), Library of Congress Card Number: 62–13420 (pp. 80–85).

JOHN F. CAMPBELL, *Primary Examiner.*